US009357367B2

(12) United States Patent
Ranki et al.

(10) Patent No.: US 9,357,367 B2
(45) Date of Patent: May 31, 2016

(54) EMERGENCY BEACONS

(75) Inventors: Ville Ranki, Espoo (FI); Antti Kainulainen, Espoo (FI); Fabio Belloni, Espoo (FI)

(73) Assignee: Nokia Technologies Oy, Espoo (FI)

( * ) Notice: Subject to any disclaimer, the term of this patent is extended or adjusted under 35 U.S.C. 154(b) by 308 days.

(21) Appl. No.: 13/978,970

(22) PCT Filed: Jan. 11, 2011

(86) PCT No.: PCT/IB2011/050118
§ 371 (c)(1),
(2), (4) Date: Oct. 8, 2013

(87) PCT Pub. No.: WO2012/095698
PCT Pub. Date: Jul. 19, 2012

(65) Prior Publication Data
US 2014/0031002 A1    Jan. 30, 2014

(51) Int. Cl.
*H04M 11/04* (2006.01)
*H04W 4/22* (2009.01)
*G01S 5/00* (2006.01)
(Continued)

(52) U.S. Cl.
CPC ............... *H04W 4/22* (2013.01); *G01S 5/0027* (2013.01); *G01S 5/0231* (2013.01); *H04M 1/72536* (2013.01); *H04W 52/0209* (2013.01); *G08G 1/0965* (2013.01); *H04W 4/12* (2013.01)

(58) Field of Classification Search
CPC ............................. H04W 4/22; H04W 76/007
USPC ................. 455/404.2, 404.1, 456.1
See application file for complete search history.

(56) References Cited

U.S. PATENT DOCUMENTS 6,222,484 B1    4/2001   Seiple et al.
2004/0203843 A1  10/2004   Najafi
(Continued)

FOREIGN PATENT DOCUMENTS

DE    WO 03089953 A1 * 10/2003 ............ B63C 9/0005
EP    2226002 A1    9/2010
(Continued)

OTHER PUBLICATIONS

Merry S L: "Overview of the Human-Powered Submersible Races", Sep. 18, 1989; Sep. 18, 1989-Sep. 21, 1989, vol. 6, Sep. 18, 1989, pp. 1-2, XP010222515.
(Continued)

*Primary Examiner* — Chuck Huynh
(74) *Attorney, Agent, or Firm* — Locke Lord LLP

(57) ABSTRACT

A portable battery-powered communications device is configured to operate in a bidirectional communications mode in which voice and/or data is communicated in a bidirectional manner using a bi-directional communications protocol; and to operate in an emergency beacon mode. When the device is in the emergency beacon mode the device is configured periodically to transmit an emergency positioning message at maximum power using the bi-directional communications protocol, transmission of the emergency positioning message defining a beacon transmit period; optionally, to listen for transmissions using the bi-directional communications protocol in a beacon response period immediately following the beacon transmit period; and to refrain from powering transmit and receive circuitry of the device other than during the beacon transmit period and the beacon response period.

15 Claims, 3 Drawing Sheets

(51) Int. Cl.
　　*G01S 5/02*　　(2010.01)
　　*H04W 52/02*　　(2009.01)
　　*H04M 1/725*　　(2006.01)
　　*G08G 1/0965*　　(2006.01)
　　*H04W 4/12*　　(2009.01)

(56) References Cited

U.S. PATENT DOCUMENTS

2008/0247366 A1　　10/2008　　Celentano et al.
2012/0064855 A1*　　3/2012　　Mendelson .......... G01C 21/206
　　　　　　　　　　　　　　　　　　　455/404.2

FOREIGN PATENT DOCUMENTS

GB　　　　2430064 A　　3/2007
WO　　　03089953 A1　　10/2003

OTHER PUBLICATIONS

Toru Yoshikawa et al: "Development of 27MHz/40MHz bands maritime wireless ad-hoc networks", Ubiquitous and Future Networks (ICUFN), 2010 Second International Conference On, IEEE, Piscataway, NJ, USA, Jun. 16, 2010, pp. 177-182, XP031731581, ISBN: 978-1-4244-8088-3.

European Extended Search Report for European Patent Application No. 11855744, Date of Completion of Search: Jun. 18, 2014, 13 pages.

International Search Report received for corresponding Patent Cooperation Treaty Application No. PCT/IB2011/050118, dated Oct. 17, 2011, 13 pages.

* cited by examiner

EMERGENCY BEACONS

RELATED APPLICATION

This application was originally filed as Patent Cooperation Treaty Application No. PCT/IB2011/050118 filed Jan. 11, 2011.

FIELD

This invention relates to emergency beacons. In particular, the invention relates to a portable device configured to operate in an emergency beacon mode. The invention relates also to corresponding methods.

BACKGROUND

It is well known that mobile telephone network availability in remote or wilderness areas can be poor or non-existent. Users of wilderness areas, including walkers, climbers, skiers etc., thus cannot rely on mobile phone connectivity to alert the emergency services in the event of an emergency situation. Various solutions have been proposed for allowing lost and/or injured persons to be located in remote areas. Each solution has its own deficiencies.

SUMMARY

The invention is defined by the claims.

BRIEF DESCRIPTION OF THE DRAWINGS

Embodiments will now be described, by way of example only, with reference to the accompanying figures, in which.

DETAILED DESCRIPTION OF EMBODIMENTS

Figure 1:
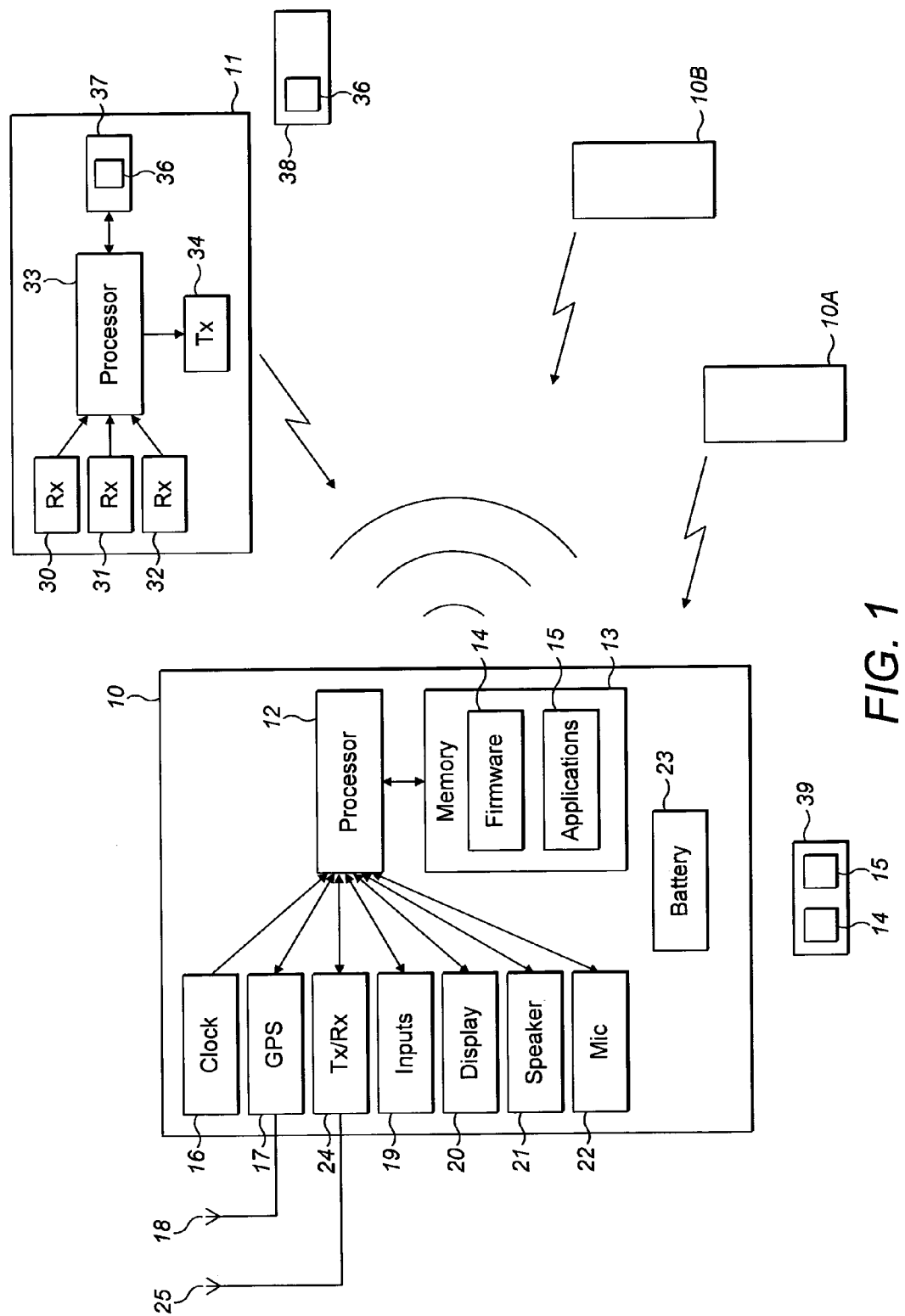
FIG. 1 is a schematic drawing illustrating an apparatus according to embodiments of the invention in communication with external devices.

FIG. 1 is a schematic drawing illustrating a device 10 according to embodiments. Also shown in FIG. 1 are second and third devices 10A and 10B and a search device 11.

The device 10 is a portable device that can be carried by a user. In this example, the device 10 is a mobile telephone or smartphone. Alternatively, it may be a notebook, netbook, tablet, PDA or other such portable communications device.

The device 10 includes a processor 12 in bidirectional communication with a memory 13. The memory 13 has stored therein firmware 14 plus one or more applications 15. The firmware 14 includes an operating system etc. The processor 12 operates under control of the firmware 14 and the applications 15 in the memory 13 to effect overall operation of the device 10. The processor 12 is in communication with a number of other components of the device 10, which will now be described briefly.

A clock 16 is arranged to provide a source of reference time to the processor 12. A GPS receiver 17 is connected to a GPS antenna 18. The GPS receiver 17 constitutes a positioning receiver. It is in communication with the processor 12, and is configured to provide the processor 12 with information relating to a location of the device 10 when so required.

One or more inputs 19 are connected to the processor 12. These may take the form of physical keys, an input part of a touch-sensitive display, or any other form. A display 20 is connected to output information under instructions of the processor 12. A speaker 21 is operable to reproduce sounds under control of the processor 12. A microphone 22 is configured to receive audio input information and convert it into electrical signals, for processing by the processor 12. A battery 23 provides electrical power to the relevant components.

A transmitter/receiver (transceiver) 24 is in bidirectional communication with the processor 12. The transceiver 24 is connected to a dedicated antenna 25. For the purposes of this example, the transceiver 24 is a Bluetooth™ Low Energy transceiver. However, it may alternatively be a Bluetooth™ transceiver, a 3G transceiver, a GSM transceiver or some other transceiver that is able to communicate voice and/or data in a bidirectional fashion with another device or network element. The transceiver 24 may be a hybrid transceiver incorporating two or more of these different bidirectional communication protocol technologies. Alternatively or in addition, an additional transceiver (not shown) may be provided. For the sake of simplicity, this specification describes only Bluetooth™ Low Energy (BLE).

The second and third devices 10A, 10B are substantially the same as the first device 10 and are configured to operate in the same way.

The search device 11 may or may not be hand-portable. The device 11 may be configured to be attached to a search vehicle, for instance a helicopter, light aircraft, motorbike, etc.

The search device 11 includes plural antenna elements, three of which are shown at 30, 31 and 32. The search device 11 also includes a processor 33, that is connected to receive signals from each of the antenna elements 30 to 32. The processor 33 operates under control of computer programs 36 stored in memory 37. The processor 33 is also connected to a transmitter 34, which is able to transmit signals under instruction from the processor 33 to the devices 10, 10A, 10B. As will be appreciated from the below discussion, the transmitter 34 may in some embodiments be omitted.

Briefly, the device 10 is configured to operate in multiple modes. In an aeroplane mode, the processor 12 disables all radio transmit devices, in this case the transceiver 24. In a bidirectional communications mode, the device 10 is able to operate normally and communicate with external devices using the transceiver 24. In an emergency beacon mode, the device 10 is configured periodically to transmit an emergency positioning message at maximum power using the transceiver 24. In the emergency beacon mode, the device 10 is configured to listen for transmissions or responses using the transceiver 24 in a beacon response period that immediately follows a period during which the emergency positioning packet is transmitted. In the emergency beacon mode, the device 10 is configured not to power the transceiver 24 other than when transmitting the emergency positioning message or optionally when listening for responses. The device 10 is configured also to operate in an enhanced beacon mode, in which bidirectional communication can be established with another device, for instance the search device 11 or one of the mobile devices 10A, 10B.

The firmware 14 and the applications 15 may be provided to the device 10 by being loaded from a data carrier 39, which may comprise optical or magnetic data storage or flash memory for instance. Loading of the firmware 14 and the applications 15 into the device 10 may occur through a suitable input or input/output device (not shown) forming part of or attached to the device 10. The input or input/output device may for instance be an optical medium reading device, such as a CD or DVD drive, or a magnetic reading device etc.

The software 36 may be provided to the search device 11 by being loaded from a data carrier 38, which may comprise optical or magnetic data storage or flash memory for instance. Loading of the software 36 into the device 10 may occur through a suitable input or input/output device (not shown) forming part of or attached to the search device 11. The input or input/output device may for instance be an optical medium reading device, such as a CD or DVD drive, or a magnetic reading device etc.

FIG. 1 illustrates two separate schemes, which will now be described with reference to FIGS. 2 and 3 respectively.

Figure 2:
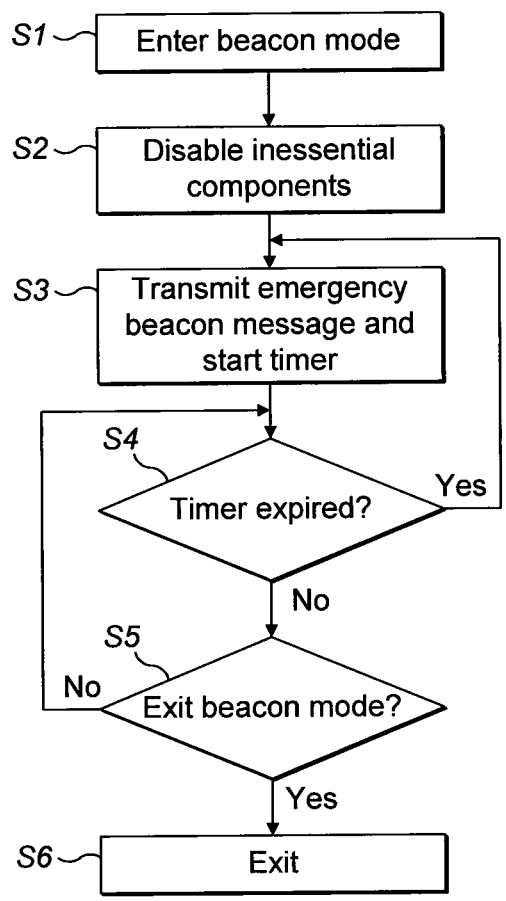
FIG. 2 is a flow chart illustrating operation of the apparatus of FIG. 1 outside the scope of the invention.
Figure 3:
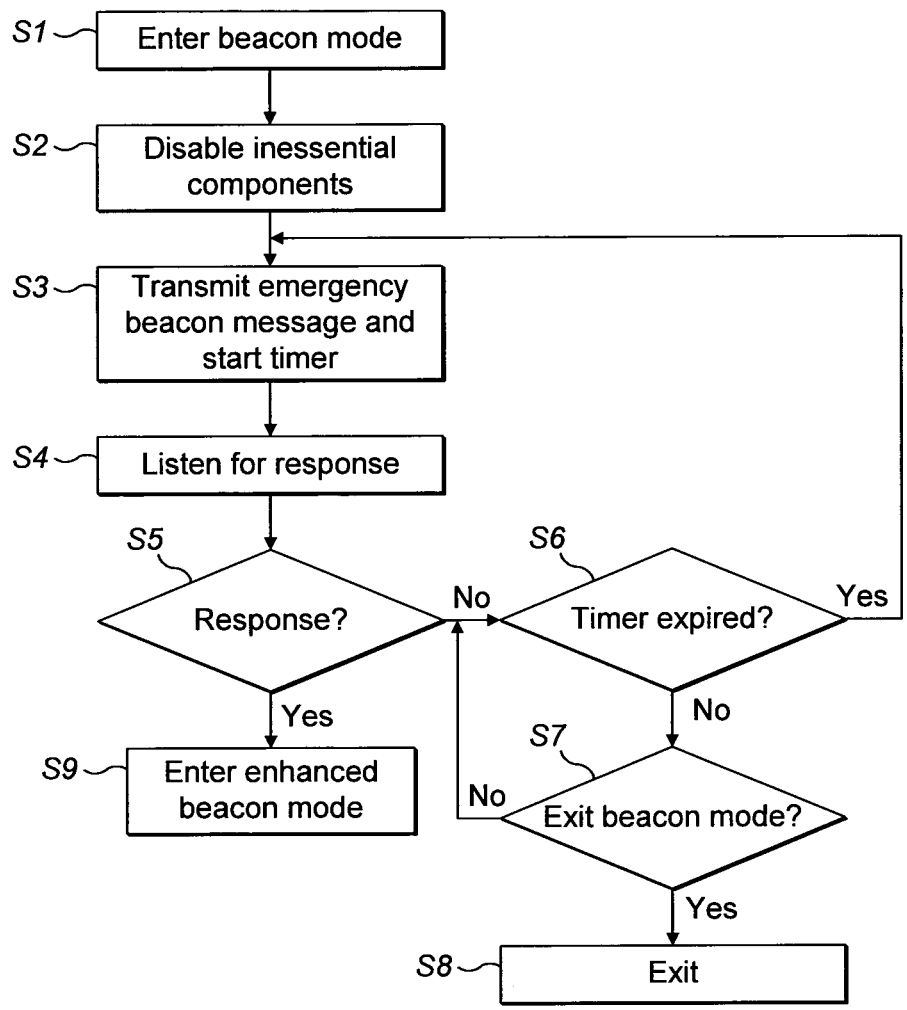
FIG. 3 is a flow chart illustrating operation of the apparatus of FIG. 1 according to embodiments of the invention.

Referring firstly to FIG. 2, which is outside the scope of the invention, at step S1 the device 10 enters an emergency beacon mode. This step can be triggered in any suitable way. For instance, this may be triggered by a user selecting an emergency beacon mode through the user interface provided by the processor 12, the inputs 19 and the display 20. The user input may alternatively be a speech input, executed through the microphone 22. Behaviour of the device 10 is different in the emergency beacon mode than it is in the aeroplane mode or the bidirectional communications mode.

At step S2, inessential component of the device 10 are disabled. Inessential components here are components that are not needed by the device to execute the functions that it is required to perform in the emergency beacon mode. These components include the speaker 21, and may include the GPS receiver 17 and/or the display 20 and/or the microphone 22. Unless explicitly stated to be in use, the transceiver 24 also is disabled in the emergency beacon mode.

At step S3, the device 10 transmits an emergency beacon message and starts a timer. The emergency beacon message is transmitted at the maximum power level that can be achieved by the device 10. The timer is provided by the clock 16 and the processor 12. The emergency beacon message is one that has a form such that the search device 11 is able to determine a bearing to the device 10 from the search device 11, such that a direction to the device 10 from the search device 11 can be determined and presented to a user of the search device 11. This is described in more detail below. The timer has a period of 5 seconds. Alternatively, the timer may have some other value, preferably in the range of 2 seconds to 30 seconds.

At step S4, it is determined whether the timer has expired. In the event of a negative determination, it is determined at step S5 whether the emergency beacon mode has been exited. The beacon mode may be exited by the user through the user interface. If the emergency beacon mode has not been exited, the operation proceeds again to step S4, where it is again determined whether the timer has expired. Once step S4 determines that the timer has expired, the operation proceeds again to step S3, where another emergency beacon message is transmitted and the timer is reset and restarted.

The arrangement of steps S3 and S4 ensures that the emergency beacon message is transmitted at intervals defined by the timer period.

Whilst steps S3 and S4 are being executed, the inessential components of the device 10 are disabled. Additionally, the transceiver 24 is operated only to transmit the emergency beacon message and is not otherwise operated. If the emergency beacon message has a transmit duration of the order of milliseconds, the transceiver 24 is operational for only a very small percentage of the time in which the device is in the emergency beacon mode. This means that power consumption of the device 10 in the emergency beacon mode is very low.

If at step S5 it is determined that it is required to exit the emergency beacon mode, the mode is exited at step S6.

An embodiment of the invention will now be described with reference to FIG. 3. In FIG. 3, steps S1, S2, S3 are the same as in FIG. 2 so are not described again.

Following step S3, the device 10 listens for a response at step S4. Step S4 is executed for a predetermined duration, which may for instance be between 0.5 ms seconds and 0.5 seconds. Step S4 involves activating the receiver part of the transceiver 24 and detecting any signals that have been transmitted in response to the emergency beacon message.

If at step S5 it is determined that no response is received, the operation proceeds to step S6. Here it is determined whether the timer that was started at step S3 has expired. If the timer has not expired, at step S7 it is determined whether it is required to exit the emergency beacon mode. This is the same as step S5 described above. The emergency beacon mode is exited at step S8 in the event of a positive determination from step S7. In the event of a negative determination from step S7, the operation proceeds again to step S6. Once step S6 determines that the timer has expired, the operation proceeds again to step S3. This ensures that the emergency beacon message is transmitted at intervals defined by the timer.

If at step S5 it is determined that a response has been received, the mobile device 10 enters an enhanced beacon mode at step S9. Here, the mobile device is configured to increase a frequency of transmission of emergency beacon messages. For instance, the emergency beacon messages may be transmitted 5 times per second. The interval between successive emergency positioning packets in the enhanced beacon mode may take any suitable value, for instance between 0.1 seconds and 2 seconds. The mobile device 10 may also be configured in the enhanced beacon mode to communicate with a device 10A, 10B or 11 that transmitted the response signal that was received at step S4.

In addition, the device 10 may provide a means for communicating between the user of the device 10 and a user of the responding device 10A, 10B, 11

The features of the device 10 described above with reference to FIGS. 2 and 3 cause it to transmit an emergency beacon message at predetermined intervals when the device is in the emergency beacon mode. The emergency beacon messages are generated such that they are receivable by the search device 11 and such that search device 11 is able to determine from the message a bearing from the search device 11 to the device 10. This may be performed in any suitable way, for instance in the manner described in WO2009/056150 or WO2010/136064.

When the device 10 is in the enhanced beacon mode, the receiving by the search device 11 of multiple messages within a short period of time allows the search device 11 to perform a more accurate fix on the bearing to the mobile device 10.

By transmitting an emergency beacon message using BLE, the message is detectable by the search device 11 several kilometers away. By transmitting the emergency beacon message at maximum transmit power, the detectable range is maximised. However, because of the other features of the device 10, this is achieved without significantly compromising the ability of the device 10 to send emergency beacon messages for many days before the battery 23 contains insufficient power to power the device 10.

It is envisaged that the search vehicle on which the search device 11 is mounted could travel over a search area at an altitude approximately 1 kilometer above ground level and listen for emergency beacon messages. Although the bearing to the mobile device 10 may not be accurate to more than a few degrees, translating to many meters at long distances, moving the vehicle carrying the search device 11 in the direction of the device 10 will result in the range being reduced and the location of the device 10 being able to be determined with more accuracy. The search device 11 may be configured to compensate for pitch, yaw and roll of the search vehicle in performing the bearing calculations so as to improve the angular resolution. The search device 11 may include an accurate GPS receiver. Using an accurate GPS fix of the position of the search device 11 allows the use of virtual arrays to virtually increase the aperture of the real array and thereby increase the angular resolution.

The devices 10, 10A and 10B are configured when in aeroplane mode or in bidirectional communications mode periodically to listen for emergency positioning messages transmitted by other devices. To listen, the device is controlled to operate the receiver part of the transceiver 24 for a duration equal to or slightly longer than the interval between successive emergency positioning messages, after which the receiver can be disabled or powered-down. The interval between successive listening periods may be relatively long, for instance several minutes or several tens of minutes, such that relatively little power is consumed when listening for emergency beacon messages. Because the listening interval extends over at least the interval between successive emergency beacon message transmissions, an emergency beacon message transmitted by another device 10, 10A, 10B will be detected if the radio channel between the two devices is sufficiently good. Optionally the listening interval is two or three times the interval between successive emergency beacon message transmissions, so as to increase the chances of an emergency beacon message being received. This may be particularly useful where channel fading may prevent an emergency beacon message being correctly received at one location but where the emergency beacon message can be correctly received a short distance away.

On receiving an emergency positioning beacon message, the device 10, 10A, 10B may alert the user of the device, for instance using the speaker 21 and/or the display 20. The device may alternatively or additionally send a response to the originating device 10, 10A, 10B. The device 10, 10A, 10B may alternatively or in addition automatically send an alert message to the emergency services or some other authority, assuming the device has connection to a communications network. If the device 10, 10A, 10B does not have connection to a communications network, it may in any case re-broadcast the emergency beacon message. In this way, an adhoc network may be formed involving plural devices in a chain between the device emitting the emergency beacon message and a device that does have connection to a communications network and can send an alert to the emergency services or other authority.

The device 10 may include information about the location of the device as determined from the GPS receiver 17 in the emergency beacon message. This can allow the mobile device to be located by a device 10, 10A, 10B, 11 receiving the emergency beacon message even if that device is not provided with direction finding capability. In the emergency beacon mode, the device 10 may be arranged to determine its location using the GPS receiver 17 at relatively long intervals, for instance at intervals of several minutes or several tens of minutes. Where the emergency beacon message includes information identifying the location of the device, the emergency beacon message may not need to be of the type that allows a bearing to the device 10 to be calculated by a receiving device.

The devices 10, 10A and 10B are also provided with a "dead man's switch" feature. When the dead man's switch feature is activated by the user, the user is required to provide an input to the device 10 periodically. If the device 10 detects that a user input has not been received within a specified period, the device 10 enters the emergency beacon mode. This allows the emergency beacon mode to be entered even without requiring the mode specifically to be enabled by a user. This may be particularly useful where the user is incapacitated, for instance through being unconscious. The device 10 may be configured to warn the user prior to entering the emergency beacon mode, and give the user an opportunity to prevent the device 10 from entering the emergency beacon mode.

The processor 12 may take any suitable form. For instance, it may comprise a single processor, or multiple processors. The multiple processors may be on a single chip, on different chips, or on different boards. References to 'processor' should be understood to encompass not only computers having different architectures such as single/multi-processor architectures and sequential (Von Neumann)/parallel architectures but also specialised circuits such as field-programmable gate arrays (FPGA), application specific circuits (ASIC), signal processing devices and other devices.

The firmware 14 may arrive at the device 10 via an electromagnetic carrier signal or be copied from a physical entity such as a computer program product, a memory device or a record medium such as a CD-ROM or DVD.

An advantage of the functionality of the device 10 as described above is that the functionality may be provided to existing devices through a firmware upgrade. This may be provided over-the-air, for instance. The functionality may instead be provided through an application 15, which may be provided to a device by downloading through an on-line marketplace or in any other way.

References to computer program, software etc. should be understood to encompass software for a programmable processor or firmware such as, for example, the programmable content of a hardware device whether instructions for a processor, or configuration settings for a fixed function device, gate array or programmable logic device etc.

The invention claimed is:

1. A portable battery-powered communications device comprising:
   at least one processor and at least one memory having computer readable code stored thereon which when executed by the at least one processor causes the device to perform:
   operating in a bidirectional communications mode in which voice and/or data is communicated in a bidirectional manner using a bi-directional communications protocol;
   operating in an emergency beacon mode, wherein operating in the emergency beacon mode comprises:
      periodically transmitting an emergency positioning message at maximum power via the bi-directional communications protocol, transmission of the emergency positioning message defining a beacon transmit period;
      listening for transmissions using the bi-directional communications protocol in a beacon response period immediately following the beacon transmit period; and
      entering an enhanced beacon mode in response to receiving a beacon response in the beacon response period;
   operating in the enhanced beacon mode, wherein operating in the enhanced beacon mode comprises:

transmitting emergency positioning messages at intervals that are shorter than the interval between successive emergency positioning messages in the emergency beacon mode; and when in the emergency beacon mode or the enhanced beacon mode, refraining from powering transmit and receive circuitry of the device other than during the beacon transmit period and the beacon response period.

2. A device as claimed in claim 1, wherein the device is configured to be switched from the bidirectional communications mode to the emergency beacon mode in response to a command received through a user interface of the device.

3. A device as claimed in claim 1, wherein the emergency positioning message includes predefined data that defines the emergency positioning message as a emergency positioning message.

4. A device as claimed in claim 1, wherein the emergency positioning message includes data relating to a location of the device.

5. A device as claimed in claim 1, wherein an interval between successive emergency positioning message transmissions is in the range of 2 seconds to 30 seconds.

6. A device as claimed in claim 1, wherein the device is configured to be switched from the bidirectional communications mode or an airplane mode to the emergency beacon mode in response to detecting no user input within a predetermined period.

7. A device as claimed in claim 1, wherein the device is configured in the bidirectional communications mode or an airplane mode to listen for emergency beacon messages transmitted by other devices.

8. A device as claimed in claim 7, wherein the device is configured in the bidirectional communications mode or the airplane mode to listen for emergency beacon messages transmitted by other devices by operating a receiver for a predetermined time that is equal to or greater than the interval between successive emergency beacon transmissions and immediately subsequently from listening for a period that is at least ten times as long as the predetermined time.

9. A method comprising:
operating a portable battery-powered communications device in a bidirectional communications mode in which voice and/or data is communicated in a bidirectional manner using a bi-directional communications protocol;
operating the portable battery-powered communications device in an emergency beacon mode, wherein operating the device in the emergency beacon mode comprises:
periodically transmitting an emergency positioning message at maximum power using the bi-directional communications protocol, transmission of the emergency positioning message defining a beacon transmit period;
listening for transmissions using the bi-directional communications protocol in a beacon response period immediately following the beacon transmit period; and
entering an enhanced beacon mode in response to receiving a beacon response in the beacon response period;
operating the portable battery-powered communications device in the enhanced beacon mode, wherein operating the device in the enhanced beacon mode comprises:
transmitting emergency positioning messages at intervals that are shorter than the interval between successive emergency positioning messages in the emergency beacon mode; and when in the emergency beacon mode or the enhanced beacon mode, refraining from powering transmit and receive circuitry of the device other than during the beacon transmit period and the beacon response period.

10. A method as claimed in claim 9, comprising switching the device from the bidirectional communications mode to the emergency beacon mode in response to a command received through a user interface of the device.

11. A method as claimed in claim 9, wherein the emergency positioning message includes predefined data that defines the emergency positioning message as a emergency positioning message.

12. A method as claimed in claim 9, wherein the emergency positioning message includes data relating to a location of the device.

13. A method as claimed in claim 9, wherein an interval between successive emergency positioning message transmissions is in the range of 2 seconds to 30 seconds.

14. A method as claimed in claim 9, comprising switching the device from the bidirectional communications mode or an airplane mode to the emergency beacon mode in response to detecting no user input within a predetermined period.

15. A non-transitory tangible computer-readable storage medium having stored thereon computer-readable code, which, when executed by a computing apparatus, causes the computing apparatus to perform a method comprising:
operating a portable battery-powered communications device in a bidirectional communications mode in which voice and/or data is communicated in a bidirectional manner using a bi-directional communications protocol;
operating the portable battery-powered communications device in an emergency beacon mode, wherein operating the device in the emergency beacon mode comprises:
periodically transmitting an emergency positioning message at maximum power using the bi-directional communications protocol, transmission of the emergency positioning message defining a beacon transmit period;
listening for transmissions using the bi-directional communications protocol in a beacon response period immediately following the beacon transmit period; and
entering an enhanced beacon mode in response to receiving a beacon response in the beacon response period;
operating the portable battery-powered communications device in the enhanced beacon mode, wherein operating the device in the enhanced beacon mode comprises:
transmitting emergency positioning messages at intervals that are shorter than the interval between successive emergency positioning messages in the emergency beacon mode; and
when in the emergency beacon mode or the enhanced beacon mode, refraining from powering transmit and receive circuitry of the device other than during the beacon transmit period and the beacon response period.

* * * * *